(12) United States Patent
Lam et al.

(10) Patent No.: US 8,401,058 B1
(45) Date of Patent: Mar. 19, 2013

(54) CHANNELIZED AMPLIFIER SYSTEM AND METHOD

(75) Inventors: Lawrence K. Lam, San Jose, CA (US); Albert T. Ngo, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 118 days.

(21) Appl. No.: 12/772,884

(22) Filed: May 3, 2010

Related U.S. Application Data

(62) Division of application No. 11/387,910, filed on Mar. 24, 2006, now Pat. No. 7,764,729.

(60) Provisional application No. 60/664,956, filed on Mar. 25, 2005.

(51) Int. Cl.
*H04B 1/38* (2006.01)

(52) U.S. Cl. ........... 375/219; 330/52; 330/54; 330/150; 455/127.3; 455/253.2; 455/311

(58) Field of Classification Search ........................ None
See application file for complete search history.

(56) References Cited

U.S. PATENT DOCUMENTS

| | | | |
|---|---|---|---|
| 5,438,684 | A | 8/1995 | Schwent et al. |
| 6,166,601 | A | 12/2000 | Shalom et al. |
| 6,324,383 | B1 * | 11/2001 | Myers .......................... 455/63.1 |
| 6,633,255 | B2 | 10/2003 | Krasner |
| 6,861,978 | B2 | 3/2005 | Lam |
| 6,906,665 | B1 | 6/2005 | Lam |
| 7,183,770 | B2 * | 2/2007 | Graβlin et al. ................ 324/322 |
| 2004/0108900 | A1 | 6/2004 | Apel |
| 2004/0108901 | A1 | 6/2004 | Apel et al. |
| 2004/0189378 | A1 * | 9/2004 | Suzuki et al. .................. 330/52 |
| 2005/0017800 | A1 * | 1/2005 | Robinson ...................... 330/149 |
| 2005/0185266 | A1 * | 8/2005 | Shushakov et al. ........... 359/344 |

OTHER PUBLICATIONS

A. Leke, et al., "Behavioral Modeling of Narrowband Microwave Power Amplifiers with Applications in Simulating Spectral Regrowth," 1996 IEEE MTT-S International Microwave Symposium Digest, Jun. 1996, pp. 1385-1388, vol. 3.
K.S. Kundert, "Introduction to RF Simulation and Its Application," IEEE Journal of Solid-State Circuits, Sep. 1999, pp. 1298-1319, vol. 34, No. 9.
G.T. Zhou, et al., "Analysis of Spectral Regrowth of Weakly Nonlinear Power Amplifiers," IEEE Communications Letters, Nov. 2000, pp. 357-359, vol. 4, No. 11.
K. Gard, et al., "Generalized Autocorrelation Analysis of Spectral Regrowth from Bandpass Nonlinear Circuits," 2001 IEEE MTT-S International Microwave Symposium Digest, May 2001, pp. 9-12, vol. 1.
J. De Mingo, et al., "Performance of a new digital baseband predistorter using calibration memory," IEEE Trans. Vehicular Technology, Jul. 2001, pp. 1169-1176, vol. 50, No. 4.
Junghyun Kim, et al., "A new 'active' predistorter with high gain and programmable gain and phase characteristics using cascade-FET structures," IEEE Trans. on Microwave Theory and Techniques, Nov. 2002, pp. 2459-2466, vol. 50, No. 11.

(Continued)

*Primary Examiner* — David C. Payne
*Assistant Examiner* — Adolf Dsouza
(74) *Attorney, Agent, or Firm* — McDermott Will & Emery LLP

(57) ABSTRACT

A channelized amplification system and method for mitigating non-linear amplification effects and controlling spectral re-growth is disclosed. A channelized amplifier system includes a frequency divider, a plurality of distributors coupled to the frequency divider, and a plurality of amplification modules coupled to the plurality of distributors. Each of the plurality of amplification modules includes a plurality of channelized non-linear amplifiers, a frequency combiner having a plurality of band-pass filters and coupled to the plurality of channelized non-linear amplifiers, and a band-pass filter coupled to the frequency combiner.

8 Claims, 7 Drawing Sheets

OTHER PUBLICATIONS

O. Hammi, et al., "Adaptive baseband digital predistorter suitable for wideband signals," The 14th International Conference on Microelectronics (ICM 2002), Dec. 2002, pp. 131-134.

S. Boumaiza, et al., "Realistic power-amplifiers characterization with application to baseband digital predistortion for 3G base stations," IEEE Trans. on Microwave Theory and Techniques, Dec. 2002, pp. 3016-3021, vol. 50, No. 12.

Kyoung-Joon Cho, et al., "Multi-Order Predistortion of Power Amplifiers Using a Second Harmonic Based Technique," IEEE Microwave and Wireless Components Letters, Oct. 2003, vol. 13, No. 10.

Jeonghyeon Cha, et al., "Optimum Design of a Predistortion RF Power Amplifier for Multicarrier WCDMA Applications," IEEE Trans. on Microwave Theory and Techniques, Feb. 2004, pp. 655-663, vol. 52, No. 2.

S. Boumaiza, et al., "Implementation of an adaptive digital/RF predistorter using direct LUT synthesis," 2004 IEEE MTT-S International Microwave Symposium Digest, Jun. 2004, pp. 681-684, vol. 2.

A. Ahmed, et al., "Power amplifier linearization using memory polynomial predistorter with non-uniform delay taps," 2004 IEEE MTT-S International Microwave Symposium Digest, Jun. 2004, pp. 1871-1874, vol. 3.

A. Diet, et al., "EER Architecture Specifications for OFDM Transmitter Using a Class E Amplifier," IEEE Microwave and Wireless Components Letters, Aug. 2004, pp. 389-391, vol. 14, No. 8.

\* cited by examiner

CHANNELIZED AMPLIFIER SYSTEM AND METHOD

CROSS-REFERENCE TO RELATED APPLICATION

This application is a divisional application of U.S. patent application Ser. No. 11/387,910, filed on Mar. 24, 2006, and issued as U.S. Pat. No. 7,764,729, which claims the benefit of priority under 35 U.S.C. §119 from U.S. Provisional Patent Application Ser. No. 60/664,956 entitled "ENHANCED MITIGATION OF NON-LINEAR AMPLIFICATION EFFECTS," filed on Mar. 25, 2005, all of which are hereby incorporated by reference in their entirety for all purposes.

STATEMENT AS TO RIGHTS TO INVENTIONS MADE UNDER FEDERALLY SPONSORED RESEARCH OR DEVELOPMENT

Not Applicable

FIELD OF THE INVENTION

The present invention generally relates to electronic signal amplification and the emission of electromagnetic signals and, more particularly, relates to the suppression of out-of-band emissions at the outputs of non-linear amplifiers.

BACKGROUND OF THE INVENTION

A power amplifier is generally used to provide the final stage of amplification where the delivery of radio frequency (RF) power is required. Most power amplifiers, when pushed to deliver their maximum output power, produce at their outputs one or more harmonic and/or inter-modulation spectral components of the input signal of the amplifiers. While the input signal may be contained well within a permissible spectral band, some of the harmonic and inter-modulation components may fall outside the permissible band.

Furthermore, non-linear amplifiers cause spectral re-growth. Methods to control spectral re-growth, such as using pre-distorter circuits or highly linear but less-efficient amplifiers have not sufficiently mitigated the problem. Accordingly, it is desirable to provide for the mitigation of spectral re-growth and of other effects caused by non-linear amplification.

SUMMARY OF THE INVENTION

The present invention provides methods and systems for suppressing out-of-band emissions at the outputs of non-linear amplifiers. According to one embodiment of the present invention, appropriate filters and diplexers are used to control spectral re-growth. A high level of spectral re-growth suppression is possible using channelized highly efficient non-linear power amplifiers. Accordingly, the production of inter-modulation frequency components generated by non-linear amplification is reduced. According to one embodiment, spectral shaping is applied to an input signal, and a light-duty filter is used after a transmit power amplifier.

The present invention can minimize transmit filter requirements and the number of cables and connectors. It can also provide thin profile, reduce weight, increase efficiency, reduce manufacturing cost and decrease RF loss.

In accordance with one embodiment of the present invention, a channelized amplifier system includes: a frequency divider for converting a first signal into a plurality of frequency band signals; a plurality of channelized non-linear amplifiers coupled to the frequency divider, each of the plurality of channelized non-linear amplifiers for amplifying a corresponding one of the plurality of frequency band signals and producing a corresponding amplified signal; a frequency combiner coupled to the plurality of channelized non-linear amplifiers, the frequency combiner for combining the amplified signals from the plurality of channelized non-linear amplifiers and producing a second signal; and a band-pass filter coupled to the frequency combiner, wherein each of the plurality of frequency band signals occupies a frequency band that is different from one another.

According to another embodiment, the frequency divider is an input duplexer or diplexer, and the plurality of frequency band signals are two frequency band signals—a high frequency band and a low frequency band. The plurality of channelized non-linear amplifiers are two channelized non-linear amplifiers. The frequency combiner is an output duplexer or diplexer.

According to another embodiment of the present invention, a channelized amplifier system includes: a frequency divider for converting a first signal into a plurality of frequency band signals; a plurality of distributors coupled to the frequency divider; and a plurality of amplification modules coupled to the plurality of distributors, each of the plurality of distributors for distributing a corresponding one of the plurality of frequency band signals to the plurality of amplification modules, wherein each of the plurality of amplification modules includes: a plurality of channelized non-linear amplifiers; and a frequency combiner coupled to the plurality of channelized non-linear amplifiers.

According to yet another embodiment of the present invention, a non-linear amplifier system includes: a distributor for receiving a first signal; a plurality of amplification modules coupled to the distributor, the distributor for distributing the first signal to the plurality of amplification modules; each of the plurality of amplification modules including: a non-linear amplifier for amplifying a signal and producing a non-linearly amplified signal; and a first band-pass filter coupled to the non-linear amplifier, the band-pass filter for filtering the non-linearly amplified signal and producing a second signal.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

A Global Positioning System (GPS) satellite transmits a number of signals. A GPS system is required to protect a plurality of radio astronomy frequency bands from the RF transmissions from GPS satellites. One of the protected frequency bands is the 1610.6-1613.8 MHz band. This band is used by radio astronomers world wide for observing radio spectral emissions at 1612.231 MHz. Observations made in this band are important for characterizing OH-IR sources in space.

Figure 1A:
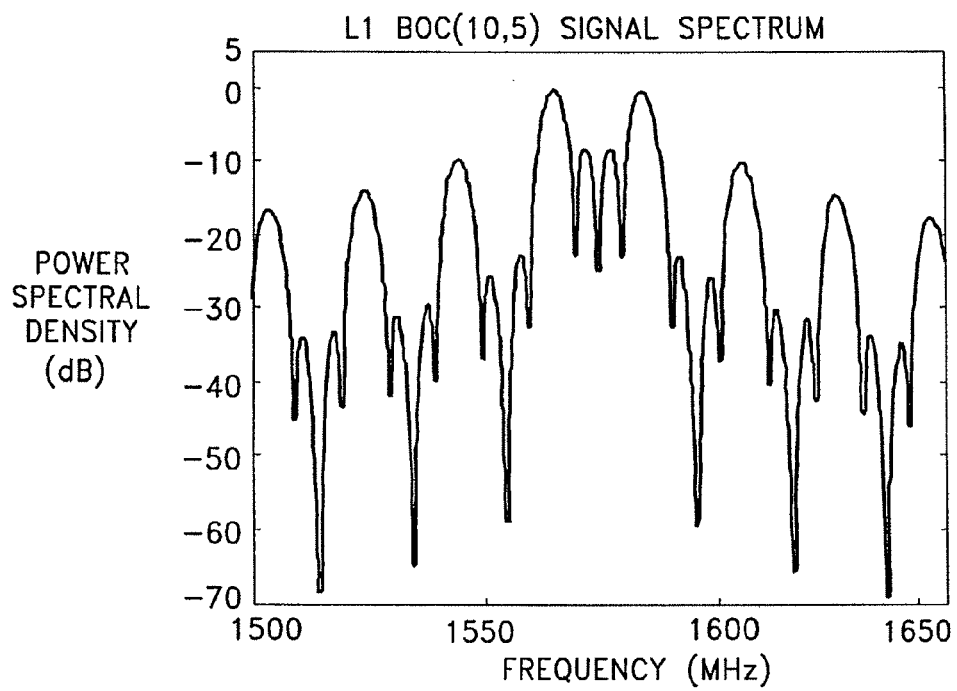
FIG. 1a illustrates an exemplary spectrum of an unfiltered constant envelop L1 BOC (10, 5) signal according to one embodiment.

One of the GPS signals is the L1 BOC (10, 5) signal, which denotes a modulation format using a Binary Offset Carrier (BOC) with indices (10, 5). The spectrum of an L1 BOC (10, 5) signal is computed by computer simulation and is shown in FIG. 1a. The L1 BOC (10, 5) signal is assigned to a spectral channel allocation from 1563.42 to 1587.42 MHz, which is 24 MHz in width centered at 1575.42 MHz. The upper edge of the assigned channel is 23.18 MHz from the lower edge of the protected band. Therefore, the spectrum sidelobes illustrated in FIG. 1a must be filtered and eliminated before the transmission of the GPS signal can be compliant with International Telecommunications Union (ITU) regulations. To meet the out-of-band emissions requirements of the ITU regulations, the spectrum of the L1 BOC (10, 5) signal is required to roll-off by more than 60 dB within a transition band of approximately 23 MHz. Accordingly, one key requirement concerning power amplifiers for GPS applications is to preserve the L1 BOC (10, 5) signal within its assigned channel while ensuring out-of-band emission reduced to an acceptable level.

According to one embodiment of the present invention, an innovative frequency-domain based method for controlling spectral re-growth is described. This method is described by way of an example based on the specifics of the GPS L1 BOC (10, 5) signal. However, it should be clear to those skilled in the art that this method is applicable to controlling spectral re-growth associated with other signal modulation types, including without limitation the orthogonal frequency division multiplexing (OFDM) modulation and the direct sequence code division multiple access (DS-CDMA) modulation. These are signal modulation types for WiFi, WiMax and IEEE 802.xx wireless applications.

The following describes the theoretical basis concerning how a frequency-domain based method works according to one aspect of the present invention. A generic band-limited signal may be represented by the sum of an assemble of discrete frequency components, as $$S = \sum_{n=1}^{N} \alpha_n \sin(2\pi f_n t + \beta_n)$$

where $\alpha_n$ and $\beta_n$ denote the magnitude and phase of the frequency components.

Passing this signal through a non-linear channel would generate a multitude of higher order harmonics and inter-modulations. The output of such a non-linear channel is described by $$S_{output} = A_{DC} + GS + \sum_{m=2}^{M} a_m S^m,$$

where $A_{DC}$ denotes a DC offset and G denotes the linear gain of the channel, and $a_m$ denotes the non-linear coefficients that would describe the non-linearity of the channel.

The third order inter-modulation is associated with a set of non-linear coefficients denoted by $\{a_m\}$ where m is an odd integer. The lowest order coefficient of the set occurs when m is 3. A complete power series expansion of $S_{input}$ can be expressed, but this is omitted for clarity purposes concerning the descriptions that follow. In a subset of that expansion, the third order inter-modulation products associated with $S^3$ as function of $a_3$, as denoted by $S^3(a_3)$, would comprise a collection of third order inter-modulation products, among which is the frequency components with frequency $(2f_p - f_q)$, as expressed by $$S^3(a_3) \propto a_3 \sum_{q=1}^{M} \sum_{p=1}^{M} \frac{3\alpha_p^2 \alpha_q}{4} \sin\{2\pi(2f_p - f_q)t + (2\beta_p - \beta_q)\} +$$

$$\frac{3\alpha_q^2 \alpha_p}{4} \sin\{2\pi(2f_q - f_p) + (2\beta_p - \beta_q)\},$$

where $p \neq q$, denoting any two frequency components within the spectrum of the original band-limited signal S. This expression shows that the spectrum of the third order inter-modulation products is three times the bandwidth of the original signal spectrum, co-located and overlapped with the original. This is spectral re-growth.

Figure 1B:
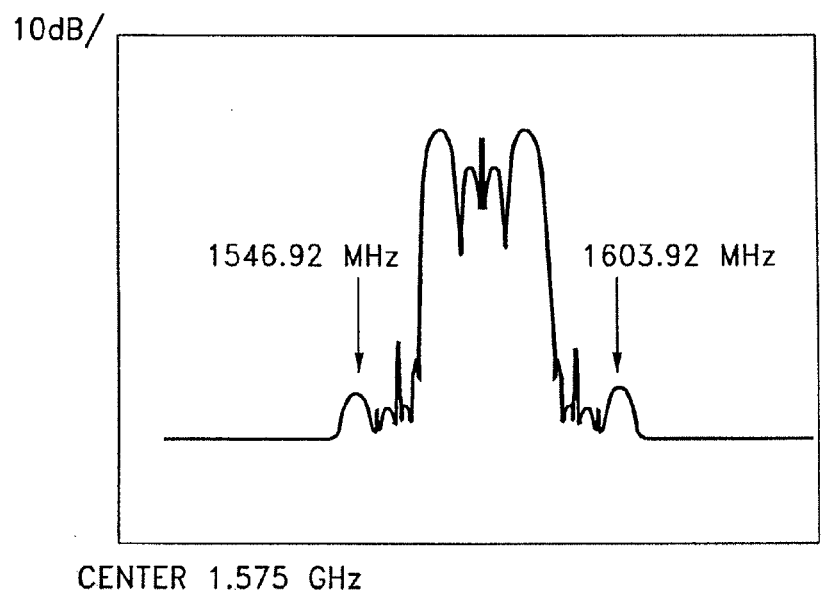
FIG. 1b illustrates two locations of the third order inter-modulation products corresponding to the spectral peaks of the L1 BOC (10, 5) signal according to one embodiment.

For the case of an L1 BOC (10, 5) signal, there are two spectral peaks, located at 1565.92 and 1584.92 MHz. Therefore the $(2f_p-f_q)$ and $(2 f_q-f_p)$ terms associated with the frequency components near these two peaks are located near 1546.92 and 1603.92 MHz. The locations of these peaks are indicated by the arrows in FIG. 1b. These arrows are pointing close to the centers of the spectral sidelobes, on both sides of the L1 BOC (10, 5) signal spectrum. Any non-linearity in an amplifier would cause spectral re-growth to emerge from these locations. The third order inter-modulation product that is located near 1603.92 MHz is less than 7 MHz from 1610.6 MHz, the edge of the protected radio astronomy band.

Figure 2:
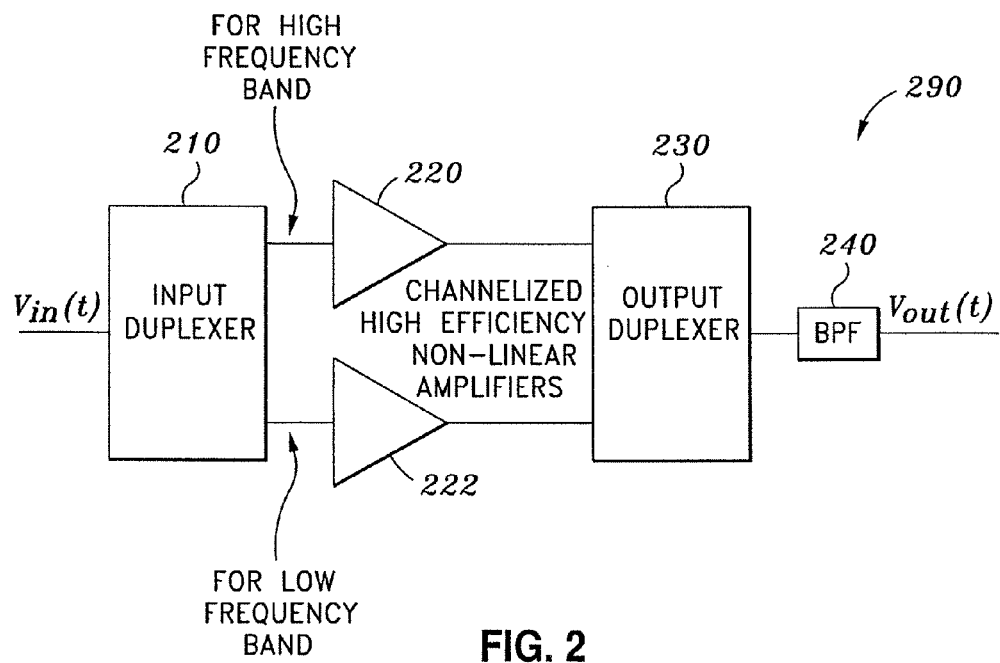
FIG. 2 is a block diagram of a channelized high-efficiency power amplifier module for mitigating out-of-band emissions produced at outputs of non-linear amplifiers in accordance with one embodiment of the present invention.

One embodiment of the present invention is illustrated in FIG. 2. A channelized amplifier system 290 includes an input duplexer or diplexer 210 to divide an input signal $V_{in}(t)$ into two frequency bands, denoted high and low frequency bands. Each of the frequency bands is a narrow band signal. The outputs of the input duplexer or diplexer 210 are coupled to two channelized high-efficiency non-linear power amplifiers 220 and 222, which operate at a certain level of non-linearity causing spectral re-growth. However, the spectral re-growth is limited in bandwidth, which allows the individual amplifiers to operate at an operating point closer to their 1 dB compression point.

The outputs of the non-linear power amplifiers 220 and 222 are coupled to an output duplexer or diplexer 230, which combines the outputs of the non-linear power amplifiers 220 and 222. The output of the output duplexer or diplexer 230 is coupled to an output band-pass filter (BPF) 240, which provides additional filtering of the signal and produces an output signal $V_{out}(t)$.

According to one embodiment, when the components 210 and 230 are diplexers, each of the input diplexer 210 and the output diplexer 230 includes two parallel filters having a high-pass filter for the high frequency band and a low-pass filter for the low frequency band. According to another embodiment, when the components 210 and 230 are duplexers, each of the input duplexer 210 and the output duplexer 230 includes two parallel filters having a high frequency band-pass filter for the high frequency band and a low frequency band-pass filter for the low frequency band. According to one aspect, a duplexer is equivalent to a combination of a diplexer and a band-pass filter.

A various combination of duplexers, diplexers and BPFs is possible. According to one embodiment of the present invention, a system includes a BPF (not shown) coupled to the input duplexer 210 and the output duplexer 230 coupled to the BPF 240. In another embodiment of the present invention, a system includes the input duplexer 210 and the output duplexer 230 and does not include a BPF before the input duplexer 210 nor the BPF 240. In yet another embodiment of the present invention, a system includes a BPF coupled to the input diplexer 210 and the output diplexer 230 coupled to the BPF 240. In yet another embodiment, additional BPFs may be utilized.

It should be noted that the present invention is not limited to two frequency bands, and other configurations may include a different number of frequency bands (e.g., 3, 4 or more frequency bands).

According to one embodiment, the present invention provides a system and method that divides a signal into two or more frequency band signals, amplifies the frequency band signals by channelized non-linear amplifiers, and then re-constitutes the multiple amplified signals to deliver cleaner signals. Such a system and method can be combined with other techniques. The amplifiers themselves may employ an Envelope Elimination and Restoration technique to control spectral re-growth. This may be applied to some of the multiple frequency band signals that are near the edges of the overall spectrum. Other benefits of the present invention include lower cost and higher reliability. Operating a single higher power and wider bandwidth amplifier would require operating the transistor at higher voltage and temperature. According to one aspect, the present invention allows amplifiers to operate at lower voltage, power level and temperature, and therefore reliability of the overall amplifiers is improved.

According to one aspect, amplifiers can be categorized based on their bias conditions. For example, a Class A amplifier is designed to bias an active transistor to operate 100% of the time in a linear region, which is defined to be a certain portion of the I-V transfer function of the transistor. A Class B amplifier is designed to bias the transistor to operate in that region 50% of the time, and a Class C amplifier is designed to bias the transistor in that region less than 50% of the time. In theory, Class E and F amplifiers are designed to bias their transistors to operate as electronic on/off switches, and thus the transistors would spend very little time operating in their linear regions. Hence, Class A amplifiers are considered to be linear amplifiers, whereas Class AB, B, C, E and F amplifiers are considered to be non-linear amplifiers. However, these notions are not limiting, and non-linear amplifiers may include other types of amplifiers.

One may suggest that non-linear amplifier should not be used for GPS applications because of their non-linearity, which would cause spectral re-growth. An alternative perspective is that all amplifiers are non-linear to a similar level when they are pushed to operate, for example, at the 1 dB gain compression point (P1 dB). The second parameter that specifies non-linearity is the output third-order intercept point (OIP3). If two amplifiers have similar P1 dB and OIP3, then their spectral re-growth levels are expected to be similar, irrespectively of their amplifier classes. According to one aspect, the key metrics for analyzing and evaluating spectral re-growth are P1 dB and OIP3.

According to one embodiment of the present invention, Class C, E or F amplifiers are used to minimize DC power consumption and heat dissipation and to provide higher power added efficiency (PAE) than Class A amplifiers. The present invention, however, is not limited to these types of amplifiers.

The system 290 is designed to reduce the production of inter-modulation frequency components generated by non-linear amplification. According to one aspect, a method for characterizing the non-linearity of an amplifier is a two-tone test. A test signal is a sum of two sinusoids, at frequencies $f_1$ and $f_2$. This signal is applied to the amplifier under test. The output of the amplifier contains a number of frequency components, and the relative levels of these frequency components are used to evaluate the non-linearity of the amplifier under test. The output of the amplifier includes the original input frequency components, $f_1$ and $f_2$, their harmonics, $2f_1$, $2f_2$, $3f_1$, $3f_2$, etc., their odd and even order sum and difference frequency inter-modulation components. For example, the third order sum and difference frequency inter-modulation components are $(2f_1-f_2)$, $(2f_2-f_1)$, $(2f_1+f_2)$, $(2f_2+f_1)$, etc.

When two frequency tones are applied to the input duplexer or diplexer 210 in FIG. 2, the input duplexer or diplexer 210 separates the two frequency tones and sends them to the two separate channelized non-linear power amplifiers 220 and 222. The outputs of the non-linear power amplifiers 220 and 222 may contain harmonic frequency components, but contains lower levels of inter-modulation components. The output duplexer or diplexer 230 combines the outputs of the non-linear power amplifiers 220 and 222. The output BPF 240 is used to filter the harmonic frequency components.

The level of third order inter-modulation produced by non-linear amplification determines highly stringent aspects of the output filter specification. Output filters may be required to provide a fast roll-off within a narrow transition frequency band. This requirement may lead to physically large and heavy filters having high insertion loss. According one aspect, the present invention can reduce the fast roll-off requirement.

Figure 3:
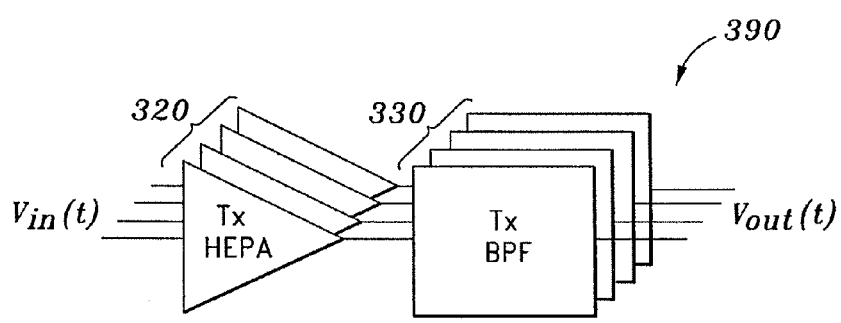
FIG. 3 illustrates a system of transmit high-efficiency power amplifiers and transmit band-pass filters in accordance with one embodiment.

FIG. 3 illustrates transmit (Tx) high-efficiency power amplifiers (HEPAs) and Tx BPFs to support an array antenna according to one embodiment. A system 390 includes multiple Tx HEPAs 320 and multiple Tx BPFs 330. The Tx HEPAs 320 receive input signals Vat), and the Tx BPFs 330, whose inputs are coupled to the outputs of the Tx HEPAs 320, produce output signals $V_{out}(t)$. According to one aspect of the invention, a L1 BOC (10, 5) signal includes a special property that can be amplified by a non-linear amplifier without suffering significant distortion. Given this property, the Tx HEPAs 320 can amplify a GPS signal for transmission purposes. The Tx BPFs 330 are "heavy duty" transmit band-pass filters placed at the output of the Tx HEPAs 320 to ensure out-of-band emission requirements are met.

According to one embodiment of the present invention, the specification of band-pass filters such as the Tx BPFs 330 is relaxed by filtering the input signal, Vat). This filtering can spectrally shape the input signal to minimize spectral side-lobes at the output of the amplifiers such as the Tx HEPAs 320.

Figure 4:
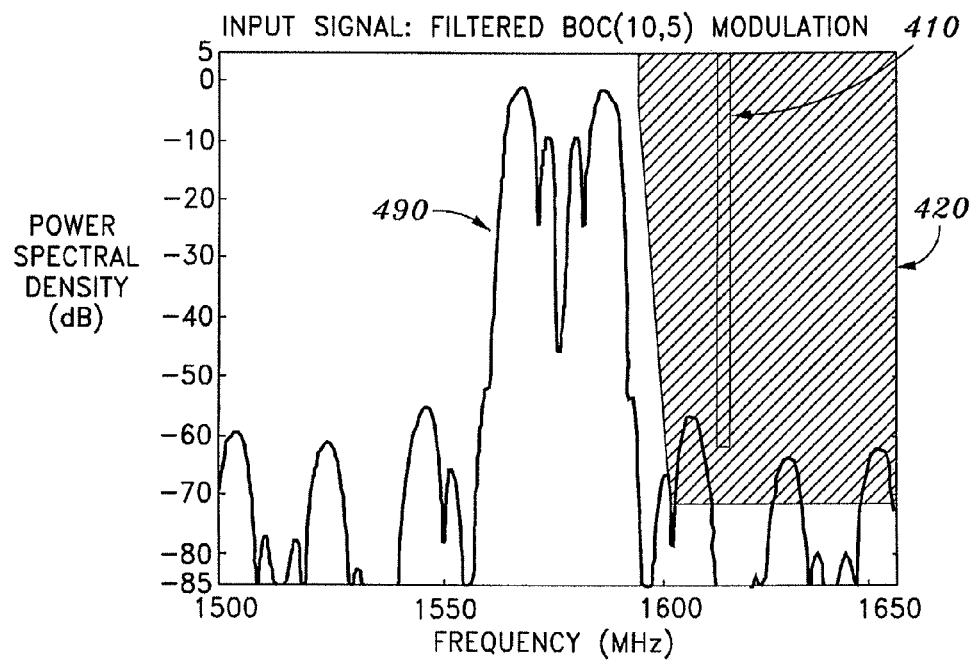
FIG. 4 illustrates a spectrum of a filtered L1 BOC (10, 5) signal according to one embodiment.

FIG. 4 illustrates a filtered L1 BOC (10, 5) signal 490 according to one embodiment of the present invention. A line 410 specifies a frequency band that should be protected. A region 420 specifies a region where emissions should be minimized.

Figure 5:
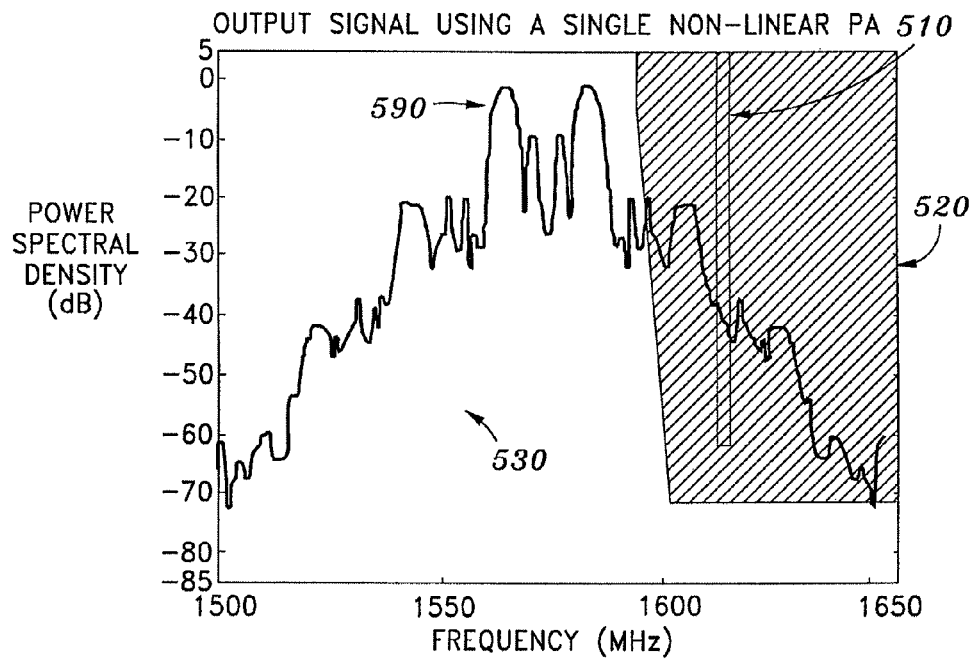
FIG. 5 illustrates a signal spectrum at the output of a high-efficiency power amplifier with the input shown in FIG. 4 in accordance with one embodiment of the present invention.

FIG. 5 illustrates an output signal of a non-linear amplifier according to one embodiment of the present invention. An output signal 590 is obtained when the filtered L1 BOC (10, 5) signal 490 of FIG. 4 is applied to a non-linear amplifier operating at about 1 dB compression. The non-linearity of the amplifier creates significant inter-modulation components, which cause spectral re-growth. These are out-of-band emissions, as indicated by a line 510 for a protected frequency band and a filter mask region 520.

FIG. 5 shows that when the spectral shape of the output signal 590 is compared to the spectral shape of an un-filtered L1 BOC (10, 5) signal 530, the band-pass filter requirement is relaxed by about 10 dB close-in, at within 20 MHz from the edge of the filter mask region 520 and by greater than 30-40 dB further-out at within >30 MHz from the edge of the filter mask region 520.

Given this improvement, a Tx BPF still needs to provide greater than 50 dB roll-off within a 20 MHz transition, from 1585-1605 MHz. This is a relatively stringent requirement for many filter technologies including conventional ceramic resonator technology. According to one embodiment, advanced filter technologies, such as custom designed ceramic resonator, film bulk acoustic resonator (FBAR) or surface acoustic wave (SAW) filters, provide the required filter roll-off rate.

Figure 6:
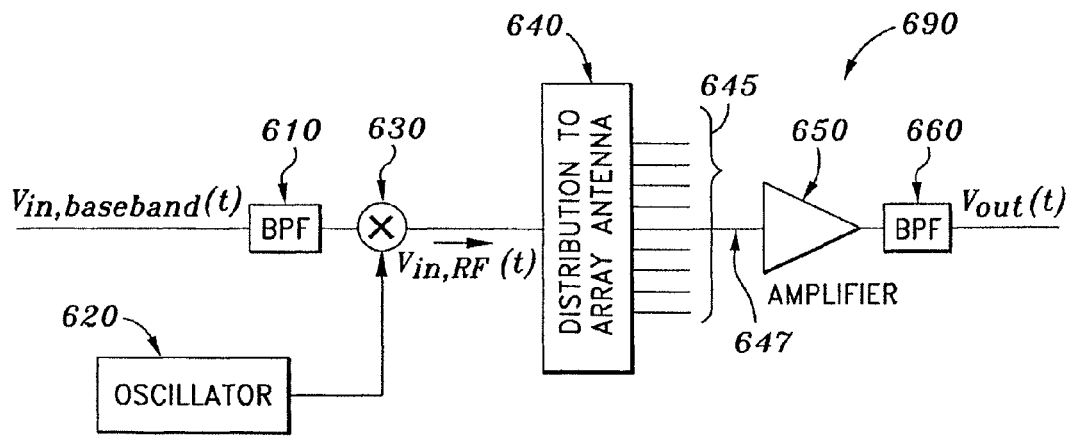
FIG. 6 illustrates a system for implementing spectral shaping before a transmit high-efficiency power amplifier in accordance with one embodiment of the present invention.

FIG. 6 illustrates a system that implements the design approach described above according to one embodiment of the present invention. A system 690 includes a first BPF 610, an oscillator 620, a mixer 630, a distributor 640, multiple non-linear power amplifiers such as an amplifier 650, and multiple BPFs such as a BPF 660. A low-pass filter may replace the BPF 610, but a band-pass filter is preferred.

A baseband L1 BOC (10, 5) input signal, $V_{in, baseband}(t)$, is applied to the BPF 610. The BPF 610 is a precision band-pass filter. The BPF 610 filters or spectrally shapes the baseband L1 BOC (10, 5) input signal. The mixer 630 provides RF up-conversion by mixing the output signal of the BPF 610 with a signal from the oscillator 620. The output of the mixer 630 is an RF signal, $V_{in, RF}(t)$. Thus, the baseband L1 BOC (10, 5) input signal is filtered or spectrally shaped to produce an spectral shape, as shown in FIG. 4, after RF up-conversion. The distributor 640 distributes the RF signal to various elements across an array antenna.

Multiple signal paths 645 indicate paths to the array antenna. One signal path 647 of the multiple paths 645 is connected to the non-linear amplifier 650 and the BPF 660. Each of the other paths of the multiple signal paths is connected to a non-linear amplifier and a BPF (not shown). For simplicity, only the non-linear amplifier 650 and the BPF 660 are shown. The non-linear amplifier 650 provides a final stage amplification, and the BPF 660 denotes a transmit band-pass filter that ensures out-of-band emission requirements are met. The functions of the other non-linear amplifiers and BPFs (not shown) are the same as the functions of the non-linear amplifier 650 and the BPF 660, respectively. The specification of the BPF 660 is less stringent than the specification of any of the "heavy duty" BPFs 330 shown in FIG. 3. The system 690 can result in significant reduction in size, weight and power in an array antenna application.

Figure 7:
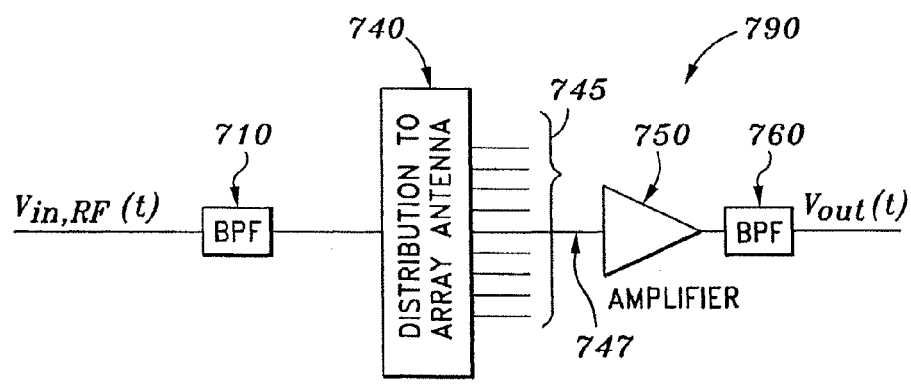
FIG. 7 illustrates a system for implementing spectral shaping before a transmit high-efficiency power amplifier in accordance with one embodiment of the present invention.

FIG. 7 illustrates an alternative embodiment of the present invention. A system 790 includes a BPF 710, a distributor 740, multiple non-linear power amplifiers such as a non-linear power amplifier 750, and multiple BPFs such as a BPF 760. One signal path 747 of multiple signal paths 745 is connected to the amplifier 750 and the BPF 760. The BPF 710, distributor 740, multiple signal paths 745, one signal path 747, multiple amplifiers such as the amplifier 750, and multiple BPFs such as BPF 760 provide functions similar to those of the BPF 610, distributor 640, multiple signal paths 645, one signal path 647, multiple amplifiers such as amplifier 650, and multiple BPFs such as BPF 660 in FIG. 6. A difference is that while the BPF 610 in FIG. 6 spectrally shapes a baseband signal, the BPF 710 in FIG. 7 spectrally shapes an RF signal. The system 790 has a mixer and an oscillator (not shown in FIG. 7 but as shown and described with reference to FIG. 6) before the BPF 710 so that the output of the mixer is connected to an input of the BPF 710. The mixer produces an RF signal, $V_{in, RF}(t)$, which is inputted into the BPF 710. The BPF 760 produces an output signal, $V_{out}(t)$.

Figure 8:
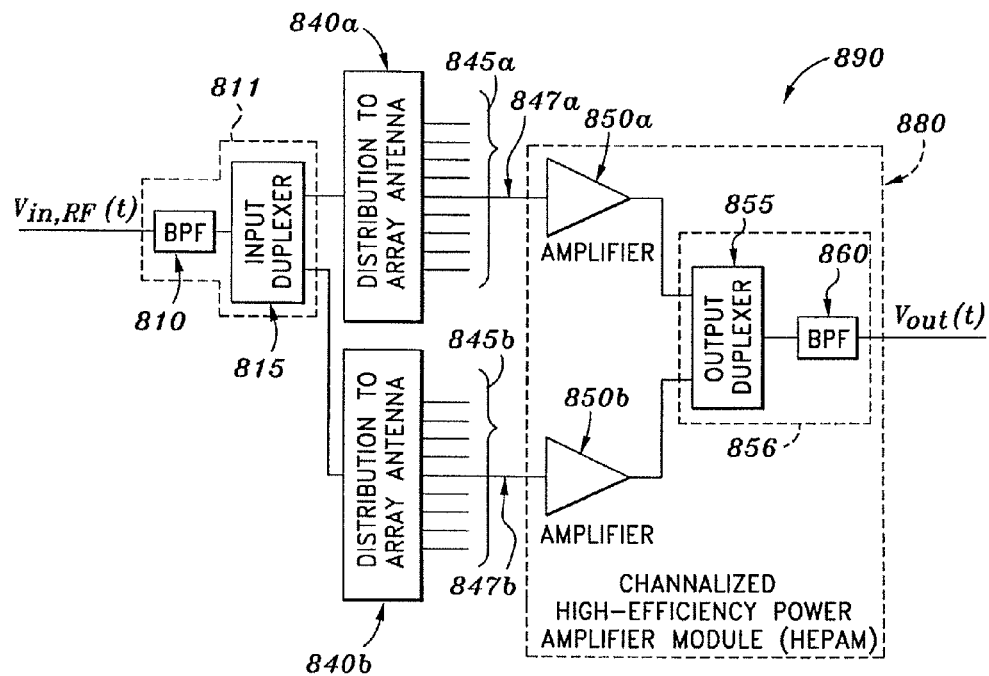
FIG. 8 illustrates a channelized high-efficiency power amplifier module system in accordance with one embodiment of the present invention.

FIG. 8 illustrates yet another embodiment of the present invention. Instead of using a single amplifier per amplification path, dual amplifiers are used per amplification path in this exemplary embodiment. In addition, an input duplexer or diplexer is located before the distribution of signals. A channelized amplifier system 890 includes a BPF 810 and an input duplexer or diplexer 815, two distributors 840a and 840b, multiple signal paths 845a, one of which is a signal path 847a, multiple signal paths 845b, one of which is a signal path 847b, and channelized high-efficiency power amplifier modules (HEPAMs) such as a channelized HEPAM 880.

The BPF 810 receives an RF signal, $V_{in, RF}(t)$, which may be generated using a mixer and an oscillator as described above. The BPF 810 filters or spectrally shapes the RF signal. The output of the BPF 810 is coupled to the input duplexer or diplexer 815, which outputs the RF signal into two frequency bands—high and low frequency bands. One output of the input duplexer or diplexer 815 is coupled to the distributor 840a, which receives the high frequency band, and the other output of the input duplexer or diplexer 815 is coupled to the distributor 840b, which receives the low frequency band.

The distributor 840a distributes the high frequency band to various elements across an array antenna. The distributor 840b distributes the low frequency band to various elements across the array antenna. Each signal path of the multiple signal paths 845a and a corresponding signal path of the multiple signal paths 845b form an amplification path of an antenna. Each amplification path is coupled to a HEPAM. For example, the signal paths 847a and 847b form an amplification path for the HEPAM 880. The HEPAMs are placed within the array antenna.

The channelized HEPAM 880 includes two channelized HEPAs 850a and 850b and one output duplexer or diplexer 855 and one BPF 860. The channelized HEPA 850a receives a high frequency band and the channelized HEPA 850b receives a low frequency band. The channelized HEPAs 850a and 850b are coupled to the distributors 840a and 840b, respectively. The outputs of the channelized HEPAs 850a and 850b are coupled to the output duplexer or diplexer 855, which combines the outputs of the channelized HEPAs 850a and 850b. The output of the output duplexer or diplexer 855 is coupled to the BPF 860, which provides additional filtering of the signal and produces an output signal, $V_{out}$ (t). Each of the other channelized HEPAMs (not shown for clarity) includes components similar to those of the channelized HEPAM 880 (e.g., two channelized HEPAs, one output duplexer or diplexer and one BPF).

As discussed previously, a various combination of diplexers, duplexers and BPFs is possible (e.g., (i) when the components 815 and 855 are duplexers, the BPFs 810 and 860 may be omitted, (ii) when the components 815 and 855 are diplexers, the component 811 (including 810 and 815) and the component 856 (including 855 and 860) may function as duplexers, or (iii) additional BPFs may be added).

Figure 9:
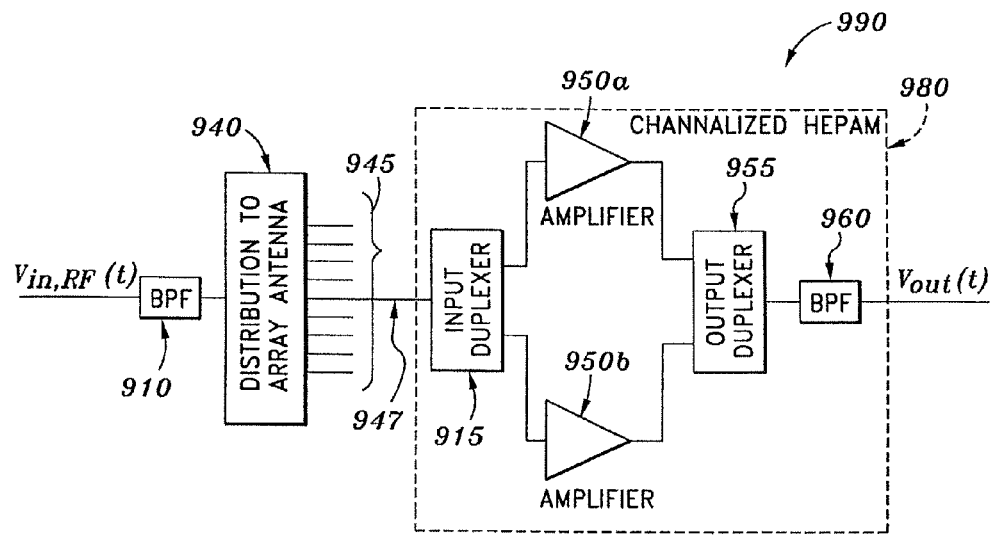
FIG. 9 illustrates a channelized high-efficiency power amplifier module system in accordance with one embodiment of the present invention.

FIG. 9 illustrates another embodiment of the present invention. In this example, an input duplexer or diplexer is part of a channelized HEPAM. A channelized amplifier system 990 includes a BPF 910, a distributor 940 and multiple channelized HEPAMs, one of which is shown as a channelized HEPAM 980. The distributor 940 are coupled to multiple signal paths 945, each of which is coupled to a corresponding one of the channelized HEPAMs. One signal path 947 of the multiple signal paths 945 is coupled to the channelized HEPAM 980 and its input duplexer or diplexer 915, which is coupled to two channelized HEPAs 950a and 950b. The outputs of the channelized HEPAs 950a and 950b are coupled to, and combined by, an output duplexer or diplexer 955. The output duplexer or diplexer 955 is coupled to a BPF 960, which provides additional filtering and produces an output, $V_{out}(t)$.

The function of the input duplexer or diplexer 915 is similar to that of the input duplexer or diplexer 815 in FIG. 8 in that the input duplexer or diplexer 915 is designed to divide its input signal into two frequency bands—a high frequency band and a low frequency band. The functions of the other components shown in FIG. 9 are also similar to the functions of those shown in FIG. 8. Each of the multiple channelized HEPAMs includes components similar to those included in the channelized HEPAM 980 (e.g., an input duplexer or diplexer, channelized HEPAs, an output duplexer or diplexer and an output BPF). In other embodiments, each of the multiple channelized HEPAMs may include a BPF coupled between the distributor 940 and an input duplexer or diplexer, and the output BPF may be omitted.

Figure 10:
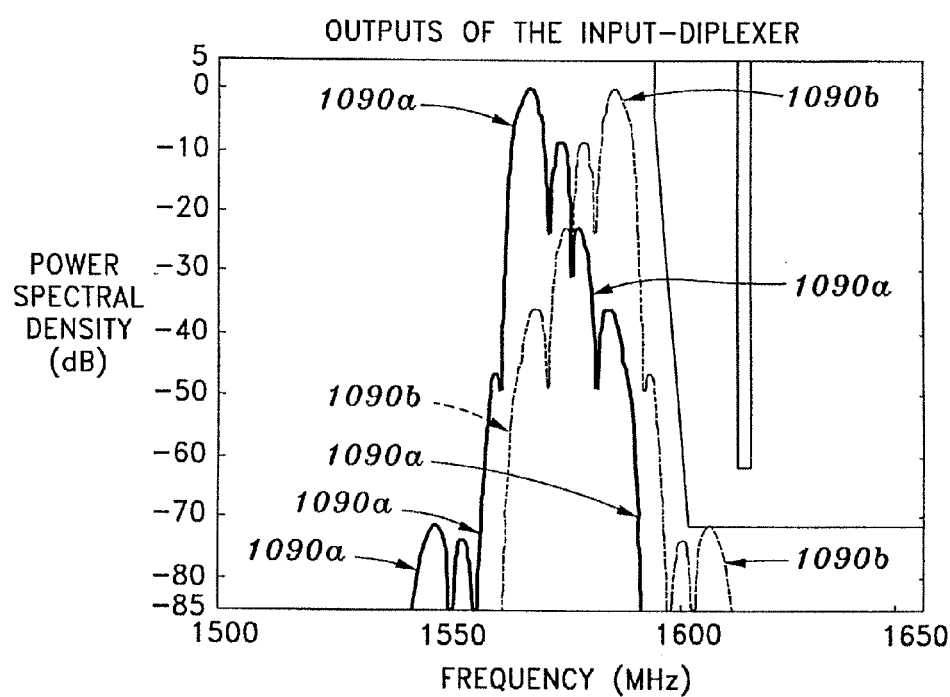
FIG. 10 illustrates filtered L1 BOC (10, 5) signals at the outputs of an input diplexer according to one aspect of the present invention.

The input signal of the input duplexer or diplexer 915 is a band-limited L1 BOC (10, 5) signal, as shown in FIG. 4. The outputs of the input duplexer or diplexer 915 are illustrated in FIG. 10. A dotted curve 1090b denotes a high frequency band output, and a curve 1090a denotes a low frequency band output.

The high frequency band output 1090b includes a single primary spectral peak. This signal is applied to the channelized high frequency band HEPA 950a. Similarly, the low frequency band output 1090a, including a single primary spectral peak, is applied to the channelized low frequency band HEPA 950b. The outputs of the two channelized HEPAs 950a and 950b are combined by the output duplexer or diplexer 955. It should be noted that the input duplexer or diplexer 915 has attenuated one of the primary peaks by approximately 40 dB.

Figure 11:
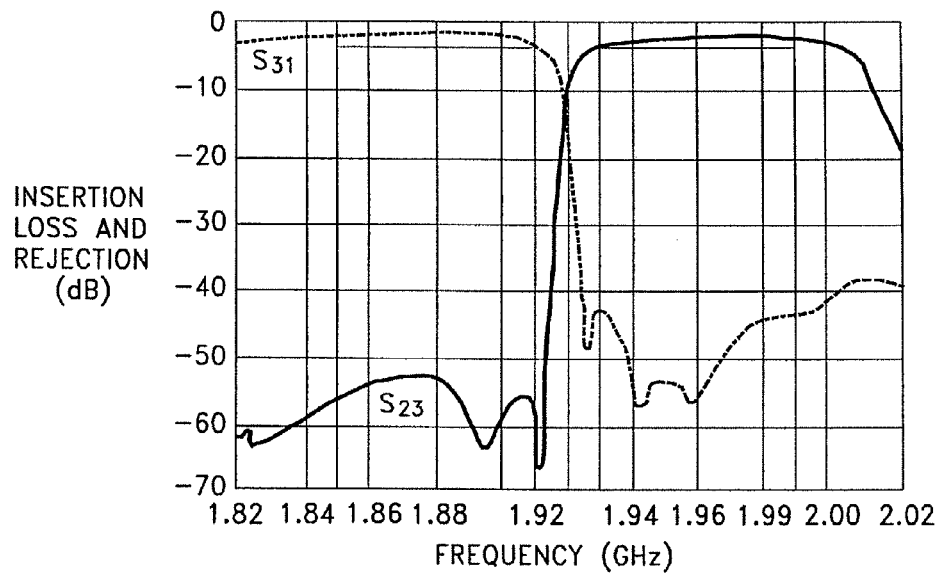
FIG. 11 illustrates a device response for diplexer PIN HPMD-7904 according to one embodiment.
Figure 12:
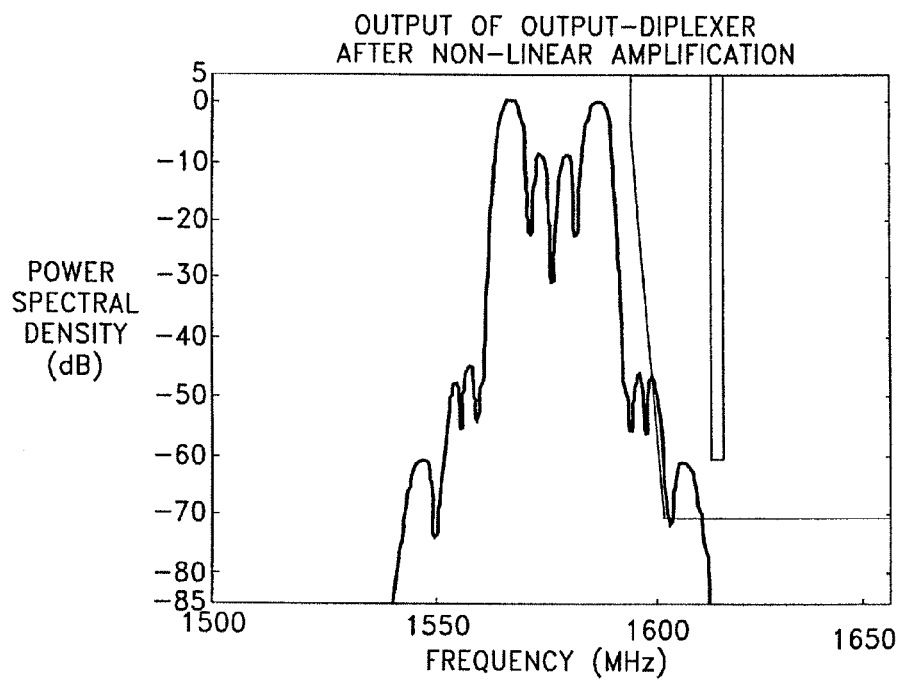
FIG. 12 illustrates filtered L1 BOC (10, 5) signal at the output of an output diplexer in accordance with one embodiment of the present invention.

FIG. 11 is an illustration of a transfer response of an Agilent diplexer P/N HPMD-7904. It shows that this device provide 40 dB frequency roll-off within a transition band of 10 MHz, centered at approximately 1.92 GHz. FIG. 12 is a simulated result showing the filtered L1 BOC (10, 5) signal at the output of the output duplexer or diplexer 955. The result indicates that spectral re-growth can be suppressed by greater than 20 dB (e.g., more than 40 dB, 50 dB, 60 dB or better), reducing the need for a heavy-duty output BPF. According to one embodiment, the present invention can provide at least 60 dB frequency roll-off within a transition band of approximately 23 MHz.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

For example, in other embodiments of the present invention, additional amplifiers, phase shifters and attenuators may be added to increase amplification, add phase shifting and signal attenuation capabilities within a HEPAM. Furthermore, the invention is not limited to generating an RF signal using a mixer and an oscillator described above. Moreover, in other embodiments, some of the components shown above may be eliminated, and/or additional components (e.g., additional amplifiers and BPFs) having functions similar to those described above may be added. According to one aspect of the present invention, the HEPAs are RF non-linear amplifiers, and the HEPAs are used in a transmission path, but the present invention is not limited to these aspects.

Furthermore, the present invention may be used with other types of modulations, including, without limitation, modulation types such as orthogonal frequency division multiplexing (OFDM) and direct sequence code division multiple access (DS-CDMA).

In regards to spectral re-growth, OFDM presents a greater challenge to a conventional power amplifier. One reason is that OFDM waveforms exhibit a significantly higher peak-to-average-power ratio than that of CDMA. A power amplifier needs to operate further below its 1 dB compression point to control spectral re-growth. Operating as such would result in lower power amplifier efficiency, and higher heat dissipation.

According to one embodiment of the present invention, a frequency divider separates an OFDM signal into 4 or N different frequency bands. The separated components are amplified by 4 or N channelized high-efficiency non-linear power amplifiers, each causing less spectral re-growth. A frequency combiner re-combines the separately amplified frequency bands to deliver a clean but amplified version of the original signal. The number N can be any numbers.

The spectrum of a DS-CDMA signal is relatively continuous. According to one embodiment, a DS-CDMA signal is sub-divided into N frequency bands, amplified and then re-combined without significant degradation using a frequency divider, channelized high-efficiency non-linear power amplifiers and a frequency combiner. The reason is that DS-CDMA is based on spreading information over a bandwidth that is wider than the information bandwidth. The spectral content in such a signal is highly redundant. As a result, this type of signal is highly resistant to the conditions of communication channels.

A major characteristics of direct sequence spread spectrum (DSSS) signal is that data or information is spread over the entire spectrum, and data recovery is relatively robust even if a small part of the spectrum is missing, or altered, or jammed.

According to one embodiment of the present invention, the input duplexers or diplexers and output duplexers or diplexers described above may be frequency dividers and frequency combiners, where a frequency divider is for converting a signal into N frequency band signals, and a frequency combiner is for combining N signals into one signal, where N can be any whole number greater than 1.

According to one embodiment, a frequency divider may include (i) a duplexer, (ii) a diplexer, (iii) a diplexer and a BPF, (iv) a duplexer and a BPF, or (v) other variations. According to one embodiment, a frequency combiner may include (i) a duplexer, (ii) a diplexer, (iii) a diplexer and a BPF, (iv) a duplexer and a BPF, or (v) other variations. A system of the present invention may include additional BPFs. According to one embodiment, a frequency divider may be a frequency demultiplexer, and a frequency combiner may be a frequency multiplexer.

According to another embodiment, a system creates more than two frequency bands, and more than two channelized non-linear amplifiers are used. The system includes either one distributor or more than two distributors.

As a variation of FIG. 8, according to one embodiment, a system includes a first BPF for receiving a RF signal and a frequency divider for dividing or separating the RF signal into N frequency band signals. The system further includes N distributors. Each of the N distributors receives a signal corresponding to one of the N frequency band signals, and each distributor distributes the received signal into M amplification modules, for example, in an array antenna, each module including an amplification path. Each of the M amplification modules includes N channelized high-efficiency non-linear RF power amplifiers (or N amplifiers per amplification path), a frequency combiner and a second BPF. The Nth distributor is coupled to the Nth amplifier in each of the M amplification modules. In each of the amplification modules, a frequency combiner combines signals from the corresponding N amplifiers, and the frequency combiners is coupled to the corresponding second BPF. The numbers N and M can be the same or different numbers.

As a variation of FIG. 9, according to one embodiment, a system includes a first BPF, a distributor for receiving a signal from the first BPF and distributing it to M amplification modules, for example, in an array antenna. Each of the M amplification modules includes a frequency divider coupled to the distributor, N channelized high-efficiency RF power amplifiers, a frequency combiner and a second BPF. In each of the M amplification modules, the frequency divider converts a signal received from the distributor into N frequency band signals and is coupled to the corresponding N channelized high-efficiency non-linear RF power amplifiers, which are coupled to the corresponding frequency combiner. In each of the M amplification modules, the frequency combiner combines the signals from the corresponding N channelized high-efficiency non-linear RF power amplifiers, and the frequency combiner is coupled to the corresponding second BPF. The numbers N and M can be the same or different numbers.

According to one aspect, each of the N frequency band signals occupies a frequency band that is different from each other. It is preferable to minimize overlap of the frequency bands, but it is possible that the frequency bands may overlap at least partially. According to another aspect, the frequency bandwidth of the signal provided to the frequency divider is wider than the frequency band of any one of the N frequency band signals provided to N channelized non-linear amplifiers, and the frequency bandwidth of an output of the frequency combiner is wider than the frequency band of any one of the N frequency band signals.

What is claimed is:

1. A channelized amplifier system comprising:
    a first band-pass filter for spectrally shaping a signal;
    a frequency divider coupled to the first band-pass filter, the frequency divider for converting the spectrally-shaped signal into a plurality of frequency band signals;
    a plurality of distributors coupled to the frequency divider, the plurality of distributors for providing multiple signal paths to an array antenna; and
    a plurality of amplification modules coupled to the plurality of distributors, each of the plurality of distributors for distributing a corresponding one of the plurality of frequency band signals to the plurality of amplification modules,
    wherein each of the plurality of amplification modules includes:
        a plurality of channelized non-linear amplifiers, wherein at least one of the plurality of channelized non-linear amplifiers is coupled to each of the plurality of distributors;
        a frequency combiner comprising a plurality of band-pass filters and coupled to the plurality of channelized non-linear amplifiers; and
        a band-pass filter coupled to the frequency combiner, the band-pass filter for additional filtering of a signal output from the frequency combiner.

2. A channelized amplifier system of claim 1, wherein the number of the plurality of distributors equals the number of the plurality of channelized non-linear amplifiers in each of the plurality of amplification modules.

3. A channelized amplifier system of claim 1 further comprising
    an up-converter coupled to the first band-pass filter.

4. A method of operating an antenna array having a plurality of elements, comprising:
    spectrally shaping a radio frequency (RF) signal to produce a first signal;
    distributing the first signal to a plurality of amplifier modules;
    converting, at each of the plurality of amplifier modules, the first signal into a plurality of frequency band signals;
    amplifying and band-pass filtering, at each of the plurality of amplifier modules, each one of the plurality of frequency band signals to produce a corresponding amplified signal;
    producing, by combining the amplified signals, a second signal at each of the plurality of amplifier modules;

generating, by band-pass filtering the second signal, a band-pass output signal at each of the plurality of amplifier modules; and distributing each of the plurality of band-pass output signals to a corresponding one of the plurality of elements of the antenna array.

5. The method of claim 4, wherein the operation of amplifying further comprises non-linearly amplifying using one of a Class C amplifier, a Class E amplifier or a Class F amplifier.

6. The method of claim 4, wherein the operation of amplifying further comprises non-linearly amplifying by operating a non-linear amplifier at about or below 1 dB gain compression point.

7. The method of claim 4, wherein the operation of generating the band-pass signal further comprises generating the band-pass signal by operating a filter from one of a ceramic resonator filter, a film bulk acoustic resonator (FBAR) filter or a surface acoustic wave (SAW) filter to filter a harmonic frequency in the second signal.

8. The method of claim 4, wherein the antenna array comprises antennas for transmitting a Global Positioning System (GPS) signal, and wherein the method is for suppressing spectral re-growth in the signal by greater than 40 dB.

* * * * *